(12) United States Patent
Miyoshi et al.

(10) Patent No.: US 7,785,545 B2
(45) Date of Patent: Aug. 31, 2010

(54) EXHAUST GAS CATALYTIC CONVERSION SYSTEM

(75) Inventors: Seiji Miyoshi, Hiroshima (JP);
Hideharu Iwakuni, Hiroshima (JP);
Koji Minoshima, Hiroshima (JP);
Hiroshi Yamada, Hiroshima (JP);
Masaaki Akamine, Hiroshima (JP);
Akihide Takami, Hiroshima (JP)

(73) Assignee: Mazda Motor Corporation (JP)

( * ) Notice: Subject to any disclaimer, the term of this patent is extended or adjusted under 35 U.S.C. 154(b) by 631 days.

(21) Appl. No.: 11/826,558

(22) Filed: Jul. 17, 2007

(65) Prior Publication Data

US 2008/0056965 A1  Mar. 6, 2008

(30) Foreign Application Priority Data

Sep. 6, 2006  (JP) ............................ 2006-241397

(51) Int. Cl.
*B01D 50/00* (2006.01)
(52) U.S. Cl. ..................................... 422/180
(58) Field of Classification Search .............. 422/177, 422/180; 502/326, 304
See application file for complete search history.

(56) References Cited

U.S. PATENT DOCUMENTS

| 6,150,288 A | * | 11/2000 | Suzuki et al. ............... 501/105 |
| 6,294,140 B1 | * | 9/2001 | Mussmann et al. ......... 423/213.5 |
| 6,306,794 B1 | * | 10/2001 | Suzuki et al. ............... 502/304 |
| 7,566,424 B2 | * | 7/2009 | Miyoshi et al. ............. 422/180 |
| 2005/0119120 A1 | | 6/2005 | Iwakuni et al. |
| 2006/0019824 A1 | | 1/2006 | Miyoshi et al. |
| 2006/0217263 A1 | | 9/2006 | Kawamoto et al. |
| 2006/0233678 A1 | | 10/2006 | Miyoshi et al. |

FOREIGN PATENT DOCUMENTS

| EP | 0566401 A1 | 10/1993 |
| EP | 1308200 A1 | 5/2003 |
| EP | 1 618 951 A1 | 1/2006 |
| EP | 1 704 910 A2 | 9/2006 |
| EP | 1 712 279 A2 | 10/2006 |
| JP | 2003112049 A | 4/2003 |
| JP | 2006-035043 | 2/2006 |
| WO | 2006080369 A1 | 8/2006 |

OTHER PUBLICATIONS

European Search Report dated Mar. 4, 2009; Application No./Patent No. 07115256.5-1213 / 1900416.

* cited by examiner

*Primary Examiner*—Tom Duong
(74) *Attorney, Agent, or Firm*—Studebaker & Brackett PC; Donald R. Studebaker

(57) ABSTRACT

An upstream catalyst and a downstream catalyst are disposed in an exhaust passage of an engine. The downstream catalyst contains in the same catalyst layer thereof. Rh-doped CeZrNd mixed oxide particles on which Rh is supported and active alumina particles on which Pt is supported. The upstream catalyst is a three-way catalyst containing an oxygen storage component having a lower oxygen storage capacity than the Rh-doped CeZrNd mixed oxide.

10 Claims, 4 Drawing Sheets

EXHAUST GAS CATALYTIC CONVERSION SYSTEM

CROSS-REFERENCE TO RELATED APPLICATION

This application claims priority under 35 USC 119 to Japanese Patent Application No. 2006-241397 filed on Sep. 6, 2006, the entire contents of which are incorporated herein by reference.

BACKGROUND OF THE INVENTION (a) Field of the Invention

This invention relates to exhaust gas catalytic conversion systems.

(b) Description of the Related Art

Many exhaust gas catalytic conversion systems are composed of a manifold catalyst directly coupled to an exhaust manifold of an engine and an underfloor catalyst disposed downstream of the manifold catalyst in the direction of exhaust gas flow. The manifold catalyst mainly converts exhaust gas during a cold time of the engine and is made of a catalyst material having a high low-temperature activity. On the other hand, the underfloor catalyst mainly converts exhaust gas during a warm time of the engine during which the engine operating conditions variously change to fluctuate the A/F ratio. Therefore, the underfloor catalyst is expected to have the capacity to efficiently convert exhaust gas even if the period or amplitude of A/F ratio fluctuations largely changes. To attain this, ceria and/or one or more other oxygen storage components are conventionally used as promoters to absorb fluctuations in A/F ratio and extend the A/F ratio window for a three-way catalyst (A/F ratio width within which the catalyst effectively works). The assignee has proposed various catalysts.

For example, Published Japanese Patent Application No. 2005-161143 describes the use of, as it were, particles of Rh-supported and Rh-doped mixed oxide (composite oxide) obtained by preparing Rh-doped mixed oxide particles in which Rh (rhodium) is doped at or between crystal lattice points of a cerium-zirconium-neodymium (CeZrNd) mixed oxide and supporting Rh also on the surfaces of the Rh-doped mixed oxide particles acting as an oxygen storage component.

Furthermore, Published Japanese Patent Application No. 2006-035043 describes the use of a catalyst in which Rh-doped mixed oxide particles and Pt-supported active alumina particles are mixed or a catalyst in which the two different particles are disposed in two different catalyst layers and these catalyst layers are laid one on the other.

Furthermore, Published Japanese Patent Application No. 2006-043488 describes a lean NOx catalyst obtained by preparing Rh-doped mixed oxide particles in which Rh is doped at or between crystal lattice points of a CeZr mixed oxide and supporting Pt on the surfaces of the Rh-doped mixed oxide particles acting as an oxygen storage component.

SUMMARY OF THE INVENTION

All the above publications disclose techniques for enhancing the exhaust gas conversion performance of a single catalyst but do not aim at improving the exhaust gas conversion performance in the cooperation, as previously described, of a catalyst in an upstream side of an exhaust passage, such as a manifold catalyst, with a catalyst in a downstream side of the exhaust passage, such as an underfloor catalyst. Therefore, in order to efficiently convert vehicle exhaust gas in actuality, particularly in order to improve the conversion performance during a warn time of the engine during which the A/F ratio largely fluctuates, it is necessary to consider the relation between the upstream and downstream catalysts.

To cope with this, the assignee has already proposed an exhaust gas catalytic converter in which an oxygen storage component having a high oxygen storage/release capacity is used in the upstream catalyst and an oxygen storage component having a lower oxygen storage/release capacity than the upstream catalyst is used in the downstream catalyst (see Published Japanese Patent Application No. 2006-291918). Specifically, Rh-doped mixed oxide particles in which Rh atoms are doped at or between crystal lattice points of a CeZrNd mixed oxide are used as the oxygen storage component in the upstream catalyst. According to the proposed catalytic converter, the oxygen storage/release capacity of the upstream catalyst is high irrespective of fluctuations in the engine A/F ratio. This reduces variations in the oxygen concentration in exhaust gas flowing into the downstream catalyst and thereby prevents the downstream catalyst from decreasing its exhaust gas conversion efficiency.

In each of the Rh-doped mixed oxide particles, part of Rh doped in the mixed oxide is not exposed at the particle surface but hidden inside the particle. Therefore, the amount of Rh exposed at the particle surface is small. In order to enhance catalytic activity, it is desired to support Rh on the surface of each Rh-doped mixed oxide particle. An example of such a technique is to use Rh-supported and Rh-doped mixed oxide particles as described in Published Japanese Patent Application No. 2005-161143. The publication further describes that since Rh-doped mixed oxide particles have a high oxygen storage/release capacity, this enhances the activity of Rh supported on the particle surfaces (see Paragraph [0082] in the publication).

The inventors made further study on Rh-supported and Rh-doped mixed oxide particles and examined their exhaust gas conversion properties while the A/F ratio was largely fluctuated. They found from the examination results that when the use of Rh-supported and Rh-doped mixed oxide particles is kept in an atmosphere in which the A/F ratio fluctuates, the catalytic activity gradually degrades. The reason for this is believed to be that high-activity oxygen is released from Rh-doped mixed oxide particles with fluctuations in the A/F ratio and Rh post-supported on the surfaces of the particles is oxidized owing to the released high-activity oxygen and cannot be returned to its high-activity reduced state. Furthermore, if Rh-supported and Rh-doped mixed oxide particles are used in the upstream catalyst, the upstream catalyst becomes more likely to degrade the catalytic activity because it is close to the engine and therefore is exposed to high-temperature exhaust gas.

With the foregoing in mind, the present invention has an object of providing a high-durability exhaust gas catalytic conversion system that more effectively utilizes Rh-supported and Rh-doped mixed oxide particles in the combination of upstream and downstream catalysts to efficiently convert exhaust gas even when the engine A/F ratio largely fluctuates.

To attain the above object, in the present invention, Rh-supported and Rh-doped mixed oxide particles are used not for the upstream catalyst but for the downstream catalyst so that HC (hydrocarbon) and CO (carbon monoxide) serving as reducing agents for Rh can be supplied from upstream to the downstream catalyst. Furthermore, the downstream catalyst further contains Pt-supported active alumina particles, which convert HC to CO having high reducing power to devote the obtained CO to the activation (reduction) of Rh.

The term "dope" as employed herein refers to placing catalytic precious metal at or between lattice points of oxide crystals.

The present invention is directed to an exhaust gas catalytic conversion system including: a first catalytic converter including a first catalyst and disposed in an upstream side of an exhaust passage of an engine in the direction of exhaust gas flow; and a second catalytic converter including a second catalyst and disposed in the exhaust passage downstream of the first catalytic converter in the direction of exhaust gas flow, wherein in each of the first and second catalysts at least one catalyst layer for converting exhaust gas is formed on a honeycomb support, the at least one catalyst layer of the first catalyst contains oxygen storage component particles, active alumina particles and a catalytic precious metal supported on at least either the oxygen storage component particles or the active alumina particles, the at least one catalyst layer of the second catalyst contains active alumina particles, mixed oxide particles containing Ce cations, cations of a rare earth element other than Ce, Zr cations and Rh cations and having an oxygen storage/release capacity, Rh supported as a catalytic precious metal on the surfaces of the mixed oxide particles, and Pt supported as a catalytic precious metal on the surfaces of the active alumina particles, and the oxygen storage component particles in the first catalyst have a lower oxygen storage/release capacity than the mixed oxide particles in the second catalyst.

In the mixed oxide particles containing Ce cations, cations of a rare earth metal other than Ce, Zr cations and Rh cations and having an oxygen storage/release capacity, Rh exists at crystal lattice points of the mixed oxide or between crystal lattice points (i.e., between atoms) of the mixed oxide. Therefore, the mixed oxide particles can be referred to as Rh-doped mixed oxide particles. Furthermore, the Rh-doped mixed oxide particles on the surfaces of which Rh is supported can be referred to as Rh-supported and Rh-doped mixed oxide particles.

According to the exhaust gas catalytic conversion system of the present invention, during a cold time of the engine, the first catalyst in the upstream side of the exhaust passage effectively converts exhaust gas by the action of the active alumina particles, the oxygen storage component particles and the catalytic precious metal.

On the other hand, during a warm time of the engine, the second catalyst downstream of the first catalyst effectively converts exhaust gas. In this respect, a detailed description is given below.

First, the Rh-doped mixed oxide particles in the second catalyst downstream of the first catalyst have a high oxygen storage/release capacity. Therefore, Rh supported on the surfaces of the Rh-doped mixed oxide particles efficiently converts exhaust gas irrespective of fluctuations in the A/F ratio.

Next, the oxygen storage component particles in the first catalyst upstream of the second catalyst have a low oxygen storage/release capacity. Therefore, when the engine A/F ratio is rich, a large amount of active oxygen can be prevented from being released from the oxygen storage component particles. This means that HC and CO in exhaust gas are not oxidized so much by the first catalyst and are likely to "slip through" the first catalyst and be supplied to the second catalyst downstream of the first catalyst.

Furthermore, Pt supported on active alumina in the second catalyst efficiently promotes the oxidation reaction of HC having slipped through the first catalyst to produce CO and partially oxidized HC having high reducing power.

Therefore, even if Rh supported on the Rh-doped mixed oxide particles in the second catalyst downstream of the first catalyst is oxidized by active oxygen released from the mixed oxide particles when the A/F ratio becomes rich, it will be activated (reduced) by HC and CO having slipped through the first catalyst or by CO and partially oxidized HC produced by the catalytic action of Pt supported on active alumina in the second catalyst.

In this case, since Rh supported and Rh-doped mixed oxide particles and Pt-supported alumina particles are in the same catalyst layer, CO produced by the catalytic action of Pt effectively acts to activate Rh. In this respect, Published Japanese Patent Application No. 2006-035043 describes that effective in activating Rh is a layered structure in which Rh-doped mixed oxide particles and Pt-supported alumina particles are placed in upper and lower layers, respectively, rather than the existence of both kinds of particles in the same catalyst layer. However, this is not the case of the present invention in which the first catalyst is disposed upstream of the second catalyst.

Specifically, Published Japanese Patent Application No. 2006-035043 is the case where a relatively large amount of HC is supplied to the catalyst. If in this case Rh-doped mixed oxide particles are placed in the upper layer, it can be expected that the amount of Rh directly activated by HC in exhaust gas becomes large because of the large amount of HC. On the other hand, if Rh-doped mixed oxide particles and Pt-supported alumina particles are in the same catalyst layer, CO and partially oxidized HC having high reducing power are produced from HC in exhaust gas to some extent but HC in exhaust gas is not fully converted to CO and partially oxidized HC. In other words, the amount of CO and partially oxidized HC thus produced is small. Therefore, on the whole, higher Rh activity will be provided when Rh-doped mixed oxide particles are placed in the upper layer so that HC in exhaust gas can directly activate Rh.

In contrast, if the first catalyst is disposed upstream of the second catalyst as in the present invention, the oxygen storage/release capacity of the oxygen storage component particles in the first catalyst can be restricted to a low level but HC in exhaust gas will be oxidized in the first catalyst to some extent. Thus, the amount of HC slipping through the first catalyst and to be supplied to the second catalyst is not so large. Therefore, if Rh-doped mixed oxide particles are placed in the upper layer of the second catalyst, the amount of Rh to be directly activated by HC is limited, unlike the case of Published Japanese Patent Application No. 2006-035043, because of the small amount of HC supplied. On the other hand, if Rh-doped mixed oxide particles and Pt-supported alumina particles are in the same catalyst layer, even the small amount of HC supplied can be almost fully converted to CO and partially oxidized HC having high reducing power by Pt-supported alumina. Therefore, on the whole, higher Rh activity is provided than the case where Rh is directly activated by HC.

As seen from the above, the exhaust gas catalytic conversion system according to the present invention can avoid that Rh on Rh-doped mixed oxide particles in the second catalyst remains oxidized and gradually degrades its activity. By contrast, Rh on the Rh-doped mixed oxide particles is repeatedly subjected to oxidation due to active oxygen released from the Rh-doped mixed oxide particles and reduction due to CO and partially oxidized HC and thereby exhibits a high activity. Therefore, the exhaust gas conversion performance during a warm time of the engine during which the A/F ratio is likely to largely fluctuate can be maintained at high level for a long time.

Rh on the surfaces of the mixed oxide particles in the second catalyst is preferably supported on the mixed oxide particles by bringing a rhodium solution into contact with the mixed oxide particles and calcining the mixed oxide particles.

Rh-doped mixed oxide particles in the second catalyst can be prepared, for example, by coprecipitation and some of the raw material, Rh, is thus placed on the surfaces of the mixed oxide particles. However, using such a precipitation method, the amount of Rh supported on the particle surfaces is small. Therefore, in order to support a large amount of Rh on the particle surfaces, it is preferable to first prepare Rh-doped mixed oxide particles and then support Rh on the particle surfaces by bringing a rhodium solution into contact with the Rh-doped mixed oxide particles and calcining the Rh-doped mixed oxide particles. Even such Rh post-supported on the mixed oxide particles, coupled with the configuration of the exhaust gas catalytic conversion system of the present invention, can avoid remaining oxidized and gradually degrading its activity and, in other words, can be maintained with high activity.

Preferably, the first catalyst includes a plurality of catalyst layers laid on the honeycomb support, and Rh and Pd are placed as catalytic precious metals in different ones of the plurality of catalyst layers so that Pd is in a lower layer of the plurality of catalyst layers closer to cell walls of the honeycomb support and Rh is in an upper layer of the plurality of catalyst layers farther from the cell walls than the lower layer.

Pd is more likely to be thermally degraded than Rh and likely to be poisoned with sulfur or phosphorous. Particularly, since the first catalyst is disposed close to the engine and in the upstream side of the exhaust passage where it is likely to be exposed to high-temperature exhaust gas, Pd will be easily thermally degraded and poisoned by the high-temperature exhaust gas. With the above configuration, since Pd is placed in the lower layer, the upper layer protects Pd from thermal degradation and poisoning. Furthermore, since Rh, which will be easily alloyed with Pd, is placed in the upper layer to avoid Rh and Pd being placed in the same layer, Pd and Rh can be prevented from being sintered and alloyed even if they are close to the engine and in the upstream side of the exhaust passage.

Preferably, the lower layer of the first catalyst contains as the oxygen storage component particles an oxide including Ce, Zr, Al and a rare earth metal other than Ce and Pd is supported on the oxide. In this case, the rare earth metal other than Ce preferably comprises at least one of Y and La.

The oxide including Ce, Zr, Al and a rare earth metal other than Ce preferably includes Al in a proportion of 90 mol % or more of the total metal components.

The first catalyst preferably contains oxygen storage component particles different from the oxide including Ce, Zr, Al and a rare earth metal other than Ce, the oxygen storage component particles having no catalytic precious metal supported thereon.

Preferably, the lower layer of the first catalyst contains the active alumina particles and Pd is supported on the active alumina particles.

Preferably, the upper layer of the first catalyst contains the active alumina particles, the surfaces of the active alumina particles are covered with particles containing Zr as a main component and Rh is supported on the active alumina particles coated with Zr.

Preferably, the upper layer of the first catalyst contains oxygen storage component particles different from the oxide including Ce, Zr, Al and a rare earth metal other than Ce in the lower layer, and Rh is supported on the oxygen storage component particles in the upper layer.

DETAILED DESCRIPTION OF THE INVENTION

An embodiment of the present invention will be described below with reference to the drawings. The following description of the preferred embodiment is merely illustrative in nature and is not intended to limit the scope, applications and use of the invention.

Figure 1:
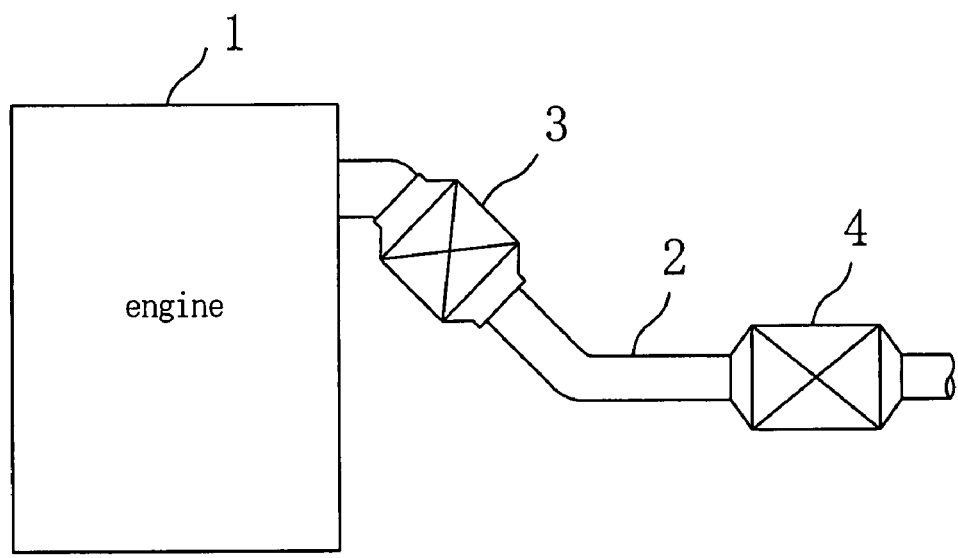
FIG. 1 is a diagram illustrating the structure of an exhaust gas catalytic conversion system for an engine according to an embodiment of the present invention.

In FIG. 1, reference numeral 1 denotes an engine of a motor vehicle, reference numeral 2 denotes an exhaust passage of the engine 1, reference numeral 3 denotes a first catalytic converter including a first catalyst (three-way catalyst) and disposed in an upstream side of the exhaust passage 2 in the direction of exhaust gas flow, and reference numeral 4 denotes a second catalytic converter including a second catalyst (three-way catalyst) and disposed in a downstream side of the exhaust passage 2. To be specific, the first catalytic converter 3 is directly coupled to the converged portion of the exhaust manifold and the second catalytic converter 4 is placed under the vehicle floor.

Configurations of First and Second Catalysts

Figure 2:
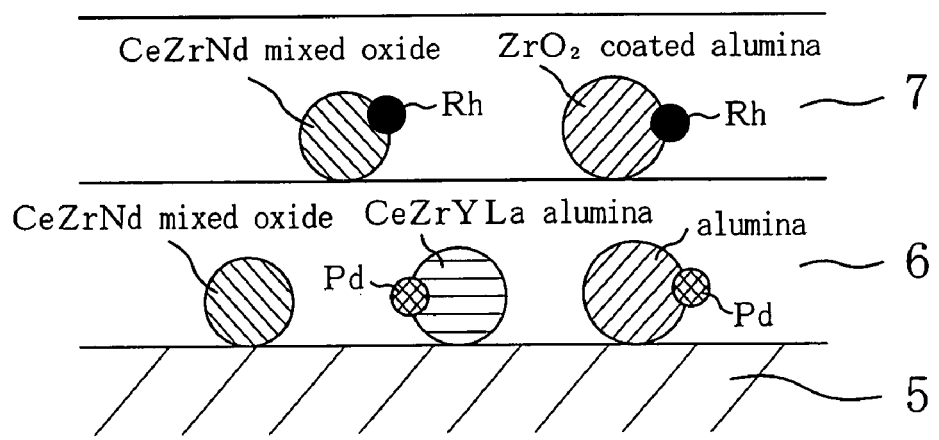
FIG. 2 is a schematically cross-sectional diagram showing the configuration of a first catalyst in the exhaust gas catalytic conversion system according to the embodiment of the present invention.

FIG. 2 shows the configuration of the first catalyst. The first catalyst has a structure in which two catalyst layers 6 and 7 for converting exhaust gas are laid on each cell wall 5 of a honeycomb support. The lower catalyst layer 6 closer to the cell wall 5 contains as catalyst components CeZrNd mixed oxide particles (CeZrNdO) having oxygen storage/release capacity and supporting no catalytic precious metal, Pd-supported CeZrYLa alumina in which Pd is supported as a catalytic precious metal on CeZrYLa alumina particles having oxygen storage/release capacity, and Pd-supported alumina in which Pd is supported as a catalytic precious metal on active alumina particles. CeZrYLa alumina particles are an oxide including Ce, Zr, Al (aluminium), and Y (yttrium) and La (lanthanum), both of which are rare earth metals other than Ce.

The upper catalyst layer 7 contains as catalyst components Rh-supported CeZrNdO in which Rh is supported as a catalytic precious metal on the surfaces of CeZrNd mixed oxide particles having oxygen storage/release capacity and Rh-supported $ZrO_2$-coated alumina in which Rh is supported as a catalytic precious metal on a support material obtained by coating the surfaces of active alumina particles with $ZrO_2$.

The lower catalyst layer 6 contains no Rh and the upper catalyst layer 7 contains no Pd.

Figure 3:
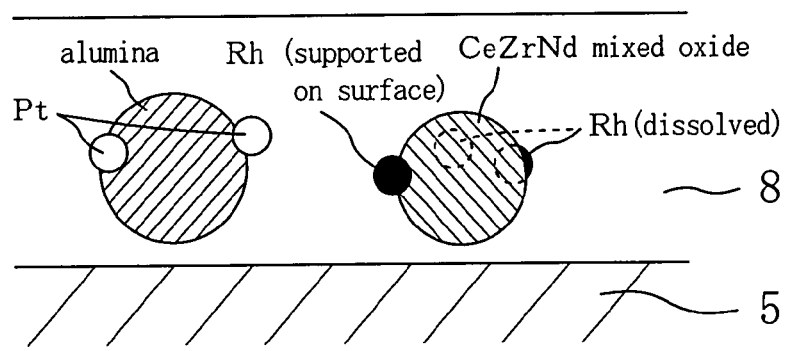
FIG. 3 is a schematically cross-sectional diagram showing the configuration of a second catalyst in the exhaust gas catalytic conversion system according to the embodiment of the present invention.

FIG. 3 shows the configuration of the second catalyst. The second catalyst has a structure in which a catalyst layer 8 for converting exhaust gas is formed on each cell wall 5 of a honeycomb support. The catalyst layer 8 contains as catalyst components Rh-supported and Rh-doped CeZrNdO in which Rh is supported as a catalytic precious metal on the surfaces of CeZrNd mixed oxide particles doped with Rh (containing Rh dissolved to form a solid solution), i.e., on Rh-doped CeZrNdO having oxygen storage/release capacity, and Pt-supported alumina in which Pt is supported as a catalytic precious metal on the surfaces of active alumina particles.

The CeZrNd mixed oxide particles having oxygen storage/release capacity in the first catalyst are an mixed oxide containing cations of Ce, Zr and Nd in its crystal lattice. The Rh-doped CeZrNd mixed oxide particles having oxygen storage/release capacity in the second catalyst are an mixed oxide containing cations of Ce, Zr, Nd and Rh in its crystal lattice.

The first catalyst is not limited to the double layer structure but may have a single layer structure or a multilayer structure including three or more layers. In the multilayer structure, Pd is placed in a lower layer or lower layers closer to the cell wall and Rh is placed in an upper layer or upper layers farther from the cell wall than the lower layer or layers.

The second catalyst is not limited to the single layer structure but may have a double layer or multilayer structure including three or more layers. Also in the double layer or multilayer structure, Rh-supported and Rh-doped CeZrNdO and Pt-supported alumina are contained together in the same catalyst layer.

Preparation Method Of First Catalyst

Preparation of Pd-supported CeZrYLa Alumina

Nitrate salts of Ce, Zr, Y, La and Al are mixed together, water is further added and the mixture is stirred at room temperature for about an hour. Next, the nitrate salt mixed solution and an alkaline solution (preferably, 28% aqueous ammonia) are neutralized by mixing them at any temperature within the range from room temperature to 80° C. The white-turbid solution obtained by the neutralization is allowed to stand for a day and night to produce a precipitated cake. The precipitated cake is centrifuged by a centrifugal separator and then well rinsed in water. The water-rinsed cake is dried at approximately 150° C., dried and calcined by keeping it at approximately 600° C. for about five hours and then keeping it at approximately 500° C. for two hours, then ground into powder. Thereafter, the obtained powder is loaded with a solution of palladium nitrate and then evaporated to dryness. The resultant dried product is ground and then calcined by heating to obtain Pd-supported CeZrYLa alumina.

Preparation of Pd-supported Alumina

A water solution of palladium nitrate is dropped on powder of active alumina to which 4 mass % La is added and the active alumina powder is then dried and calcined at 500° C., thereby obtaining Pd-supported alumina.

Preparation of CeZrNdO

Nitrate salts of Ce, Zr and Nd are mixed together, water is further added and the mixture is stirred at room temperature for about an hour. Next, the nitrate salt mixed solution and an alkaline solution (preferably, 28% aqueous ammonia) are neutralized by mixing them at any temperature within the range from room temperature to 80° C. The white-turbid solution obtained by the neutralization is allowed to stand for a day and night to produce a precipitated cake. The precipitated cake is centrifuged by a centrifugal separator and then well rinsed in water. The water-rinsed cake is dried at approximately 150° C., calcined by keeping it at 400° C. for about five hours and then ground into powder.

Preparation of Rh-supported CeZrNdO

CeZrNdO is prepared in the above manner, a rhodium nitrate solution is added to powder of CeZrNdO, the powder is evaporated to dryness, and the obtained dried product is calcined by heating, thereby obtaining Rh-supported CeZrNdO Preparation of Rh-supported $ZrO_2$-Coated Alumina A water solution of rhodium nitrate is dropped on powder of active alumina particles to which 4 mass % La is added and whose surfaces are coated with 10 mass % zirconium dioxide, and the active alumina powder is then dried and calcined at 500° C., thereby obtaining Rh-supported $ZrO_2$-coated alumina.

Formation of Catalyst Layers

CeZrNdO, Pd-supported CeZrYLa alumina, Pd-supported alumina and a zirconia binder are mixed and water is also added and mixed by stirring with a disperser to obtain a slurry. A honeycomb support is immersed in the slurry and then picked up and surplus slurry is removed by air blow. This process is repeated until the honeycomb support is coated with a predetermined amount of slurry. Thereafter, the honeycomb support is heated from normal temperature up to 500° C. at a constant rate of temperature increase in 1.5 hours. The honeycomb support is then dried and calcined by keeping it at 500° C. for two hours, resulting in the formation of a lower catalyst layer on the cell walls of the honeycomb support.

Rh-supported CeZrNdO, Rh-supported $ZrO_2$-coated alumina and a zirconia binder are mixed and water is also added and mixed by stirring with a disperser to obtain a slurry. The honeycomb support having the lower catalyst layer formed is immersed in the slurry and then picked up and surplus slurry is removed by air blow. This process is repeated until the honeycomb support is coated with a predetermined amount of slurry. Thereafter, the honeycomb support is heated from normal temperature up to 500° C. at a constant rate of temperature increase in 1.5 hours. The honeycomb support is then dried and calcined by keeping it at 500° C. for two hours, resulting in the formation of an upper catalyst layer on the lower catalyst layer.

Preparation Method of Second Catalyst

Preparation of Rh-supported and Rh-doped CeZrNdO

Nitrate salts of Ce, Zr, Nd and Rh are mixed together, water is further added and the mixture is stirred at room temperature for about an hour. Next, the nitrate salt mixed solution and an alkaline solution (preferably, 28% aqueous ammonia) are neutralized by mixing them at any temperature within the range from room temperature to 80° C. The white-turbid solution obtained by the neutralization is allowed to stand for a day and night to produce a precipitated cake. The precipitated cake is centrifuged by a centrifugal separator and then well rinsed in water. The water-rinsed cake is dried at approximately 150° C., calcined by keeping it at 400° C. for about five hours and then ground into powder. Thus, Rh-doped CeZrNdO powder is obtained. A rhodium nitrate solution is added to the Rh-doped CeZrNdO powder and the powder is then evaporated to dryness. The resultant dried product is ground and calcined by heating, thereby obtaining Rh-supported and Rh-doped CeZrNdO.

Preparation of Pt-supported Alumina

A water solution of diamminedinitro platinum nitrate is dropped on powder of active alumina to which 4 mass % La is added and the active alumina powder is then dried and calcined at 500° C., thereby obtaining Pt-supported alumina.

Formation of Catalyst Layer

Rh-supported and Rh-doped CeZrNdO, Pt-supported alumina and a zirconia binder are mixed and water is also added and mixed by stirring with a disperser to obtain a slurry. A honeycomb support is immersed in the slurry and then picked up and surplus slurry is removed by air blow. This process is repeated until the honeycomb support is coated with a predetermined amount of slurry. Thereafter, the honeycomb support is heated from normal temperature up to 500° C. at a constant rate of temperature increase in 1.5 hours. The honeycomb support is then dried and calcined by keeping it at 500° C. for two hours, resulting in the formation of a catalyst layer on the cell walls of the honeycomb support.

INVENTIVE EXAMPLE AND COMPARATIVE EXAMPLES OF CATALYTIC CONVERSION SYSTEM

Inventive Example

A catalytic conversion system having the configuration shown in Table 1 was produced according to the preparation methods of the first and second catalysts as previously described. The term "Amount of metal supported" in Table 1 refers to the amount of metal supported per L of honeycomb support. The first and second catalysts each contain 18 g/L zirconia binder. The molar ratio of metal atoms in CeZrYLa alumina, which is a Pd-supported mixed oxide in the lower layer of the first catalyst, is Ce:Zr:Y: La:Al=4.6:4.6:0.8:0.2:120. Therefore, the proportion of Al to total metals in the mixed oxide is slightly larger than 92 mol % (larger than 90 mol %).

TABLE 1

| | | | | |
|---|---|---|---|---|
| First catalyst | Upper layer | Rh-supported CeZrNdO | Amount of metal supported | 112 g/L (amount of Rh supported = 0.1 g/L) |
| | | | Composition | $CeO_2:ZrO_2:Nd_2O_3 = 22:68:10$ (mass ratio) |
| | | Rh-supported $ZrO_2$-coated alumina | Amount of metal supported | 15 g/L (Amount of Rh supported = 0.1 g/L) |
| | Lower layer | CeZrNdO | Amount of metal supported | 5 g/L |
| | | | Composition | $CeO_2:ZrO_2:Nd_2O_3 = 10:80:10$ (mass ratio) |
| | | Pd-supported CeZrYLa alumina | Amount of metal supported | 30 g/L (Amount of Pd supported = 0.1 g/L) |
| | | | Composition | $CeO_2:ZrO_2:Y_2O_3:La_2O_3:alumina = 4.6:4.6:0.8:0.2:120$ (atomic molar ratio) |
| | | Pd-supported alumina | Amount of metal supported | 50 g/L (Amount of Pd supported = 0.1 g/L) |
| Second catalyst | Single layer | Rh-supported and Rh-doped CeZrNdO | Amount of metal supported | 112 g/L (Amount of Rh post-supported = 0.035 g/L) |
| | | | Composition | $CeO_2:ZrO_2:Nd_2O_3 = 22:68:10$ (mass ratio) (Amount of Rh doped = 0.058 mass %) |
| | | Pt-supported alumina | Amount of metal supported | 50 g/L (Amount of Pt supported = 0.05 g/L) |

Comparative Example 1

A catalytic conversion system was produced to have the same configuration as Inventive Example except that the second catalyst employed, instead of Pt-supported alumina, active alumina on which no catalytic precious metal is supported (and which is doped with 4 mass % La).

Comparative Example 2

A catalytic conversion system was produced to have the same configuration as Inventive Example except that the second catalyst has a double layer structure in which Pt-supported alumina is placed in the upper layer and Rh-supported and Rh-doped CeZrNdO is placed in the lower layer.

A/F Window of Second Catalyst in Inventive Example

Only the second catalyst in Inventive Example was examined in terms of the relation between A/F ratio and exhaust gas conversion efficiencies. Specifically, the second catalyst was aged by keeping it at 1000° C. in an air atmosphere for 24 hours and then cut out in a cylindrical shape of 2.54 cm diameter and 5 cm length. The cut piece was attached to a fixed-bed flow reactor and then measured in terms of conversion efficiencies of HC, CO and NOx (nitrogen oxides) using a simulated exhaust gas.

In the measurement, the A/F ratio of the simulated exhaust gas was fluctuated within the amplitude of ±0.9 at a period of 1 Hz and, in order to examine the A/F window, the reference value of the A/F ratio to be fluctuated was changed from 14 to 15. In other words, the composition of the simulated exhaust gas was changed from A/F=14±0.9 to A/F=15±0.9. The gas compositions (volume %) at A/F=14±0.9, A/F=14.7±0.9 and A/F=15±0.9 are shown in Table 2. The simulated gas temperature at the entrance of the catalyst was set at 400° C. and the space velocity SV was set at 60000/h.

TABLE 2

| | A/F | | | | | | | | |
|---|---|---|---|---|---|---|---|---|---|
| | 14.0 ± 0.9 | | | 14.7 ± 0.9 | | | 15.0 ± 0.9 | | |
| | 13.1 | 14.0 | 14.9 | 13.8 | 14.7 | 15.6 | 14.1 | 15.0 | 15.9 |
| $C_3H_6$ (ppm) | 570 | 560 | 550 | 541 | 555 | 548 | 550 | 560 | 540 |
| CO (%) | 1.80 | 1.60 | 0.60 | 2.35 | 0.60 | 0.59 | 1.60 | 0.50 | 0.54 |
| NO (ppm) | 1000 | 1000 | 1000 | 975 | 1000 | 980 | 1000 | 1000 | 980 |
| $CO_2$ (%) | 13.50 | 13.60 | 13.70 | 13.55 | 13.90 | 13.73 | 13.60 | 13.80 | 13.60 |
| $H_2$ (%) | 0.60 | 0.53 | 0.20 | 0.85 | 0.20 | 0.20 | 0.53 | 0.16 | 0.17 |
| $O_2$ (%) | 0.28 | 0.30 | 0.75 | 0.58 | 0.60 | 1.85 | 0.35 | 0.80 | 2.00 |
| $H_2O$ (%) | 10 | 10 | 10 | 10 | 10 | 10 | 10 | 10 | 10 |

Figure 4:
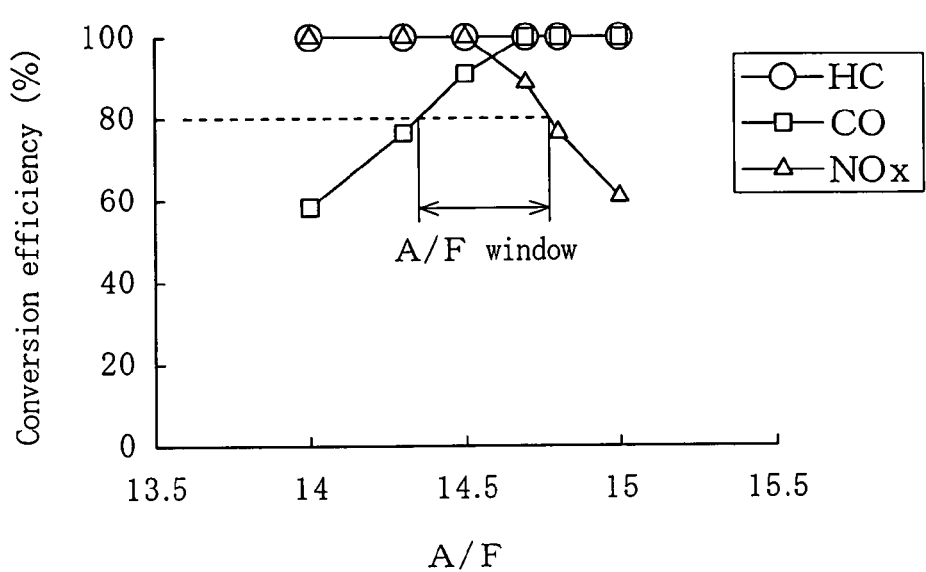
FIG. 4 is a graph showing the relation between the A/F ratio and the exhaust gas conversion efficiencies of the second catalyst according to Inventive Example.

The examination results are shown in FIG. 4. The HC conversion efficiency was approximately 100% irrespective of changes in the A/F ratio. The CO conversion efficiency decreased as the A/F ratio decreased. The NOx conversion efficiency decreased as the A/F ratio increased. FIG. 4 shows the A/F window defined as the range of A/F ratios within which all of the HC, CO and NOx conversion efficiencies reach 80% or more. In this example, the A/F window value was slightly larger than 0.4.

Comparison Among A/F Windows of Second Catalysts in Inventive Example and Comparative Examples 1 and 2

The second catalysts in Inventive Example and Comparative Examples 1 and 2 were measured in terms of conversion efficiencies of HC, CO and NOx (nitrogen oxides). In the measurement, the A/F ratio of the simulated exhaust gas was fluctuated within the amplitude of ±0.9 at periods of A/F fluctuations of 0.5 and 2.0 Hz for the second catalyst in Inventive Example and at periods of A/F fluctuations of 0.5, 0.9 and 2.0 Hz for the second catalysts in Comparative Examples 1 and 2. Then, the relative values of the A/F window were determined from the measurement results of the conversion efficiencies. The relative values are values relative to the A/F window value of Inventive Example at a period of A/F fluctuations of 1 Hz. The results are shown in FIG. 5.

Furthermore, the second catalysts in Inventive Example and Comparative Examples 1 and 2 were determined in terms of relative values of the A/F window when the A/F ratio of the simulated exhaust gas was fluctuated at a period of A/F fluctuations of 1.0 Hz within the amplitude of ±0.2 and within the amplitude of ±0.5. The results are shown in FIG. 6.

Figure 5:
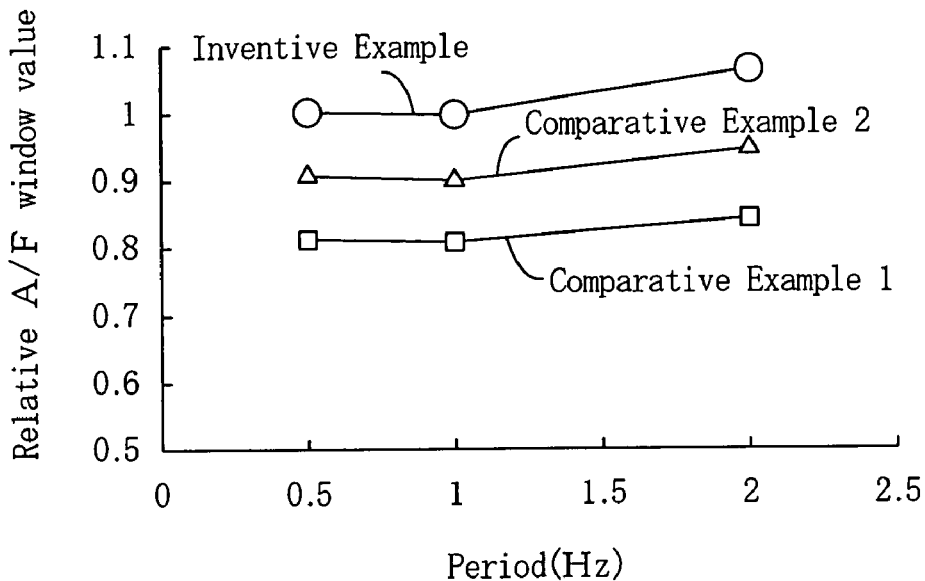
FIG. 5 is a graph showing the relation between the period of A/F fluctuations and the relative A/F window value of each of the second catalysts according to Inventive Example and Comparative Examples.
Figure 6:
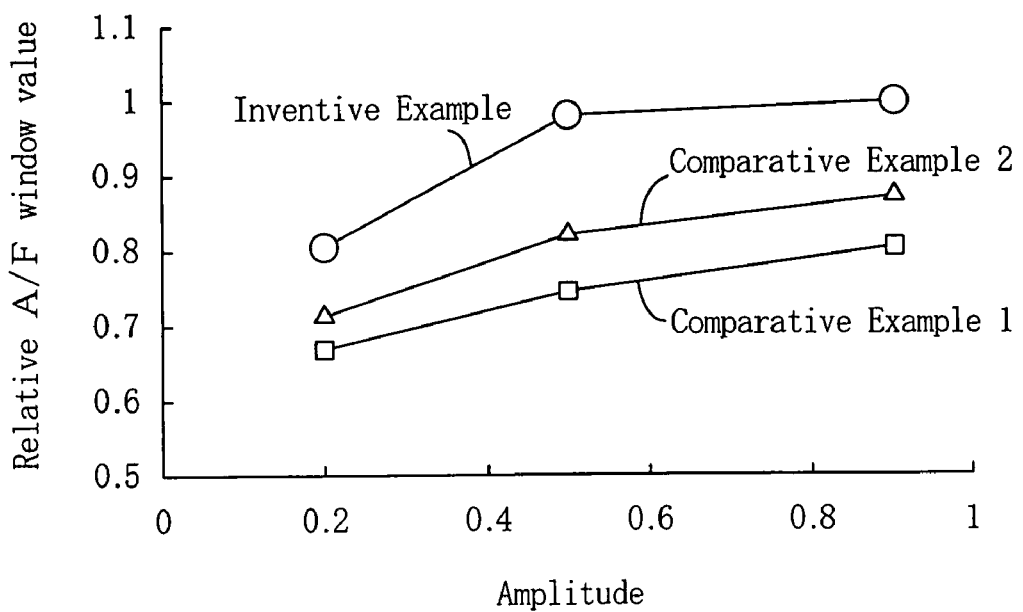
FIG. 6 is a graph showing the relation between the amplitude of A/F fluctuations and the relative A/F window value of each of the second catalysts according to Inventive Example and Comparative Examples.

FIGS. 5 and 6 show that when the period of A/F fluctuations was changed and also when the amplitude of A/F fluctuations was changed, Inventive Example had the widest A/F window, Comparative Example 2 had the second widest A/F window and Comparative Example 1 had the narrowest A/F window. The reason why Inventive Example had a wider A/F window than Comparative Example 2 in spite of the same catalyst components of the second catalyst is believed to be that Comparative Example 2 contained Rh-supported and Rh-doped CeZrNdO and Pt-supported alumina in different catalyst layers but Inventive Example contained both components in the same catalyst layer.

To be more specific, Pt-supported alumina is excellent in promoting the oxidation reaction of HC and likely to produce CO from HC in exhaust gas. Since Inventive Example contains both the catalyst components in the same catalyst layer, CO produced on Pt-supported alumina is likely to spill over Rh-supported and Rh-doped CeZrNdO and reduce Rh supported on the surfaces of Rh-doped CeZrNdO particles. In contrast, since Comparative Example 2 contains these catalyst components in different catalyst layers, CO produced on Pt-supported alumina does not effectively act to reduce Rh. Therefore, Inventive Example is believed to have a high Rh activity and in turn have a wide A/F window.

The reason for the narrow A/F window of Comparative Example 1 is believed to be that since no Pt was supported on active alumina of the second catalyst, HC, CO and NOx were not converted by Pt and the reducing effect of CO on Rh was not obtained.

Oxygen Storage/Release Capacity

Figure 7:
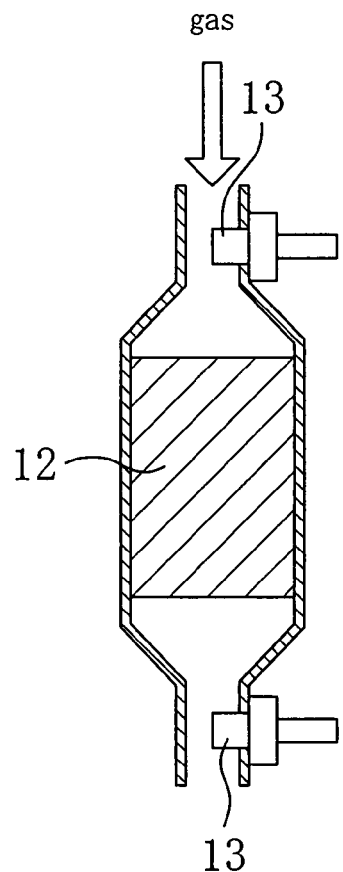
FIG. 7 is a schematic diagram illustrating a test device for measuring the oxygen storage/release amount.

The first catalyst in Inventive Example and the second catalysts in Inventive Example and Comparative Examples 1 and 2 were measured in terms of oxygen storage/release amount. Specifically, each catalyst was aged by keeping it at 1000° C. in an air atmosphere for 24 hours and then cut out into a core sample. FIG. 7 shows the structure of an essential part of a test device for measuring the oxygen release amount. The test device is configured to allow gas to flow through the core sample 12 and includes two linear oxygen sensors 13 and 13 disposed at the entrance and exit of the core sample 12.

In the measurement, gas containing 10% $CO_2$ and 90% $N_2$ was first allowed to flow through the core sample 12. Then, oxygen was added to the gas for 20 seconds (lean conditions), no gas was then added for 20 seconds (stoichiometric conditions), CO was then added for 20 seconds (rich conditions) and no gas was then added for 20 seconds (stoichiometric conditions). While this cycle was repeated, the output difference between the linear oxygen sensor at the sample entrance and the linear oxygen sensor at the sample exit, i.e., (the output at the sample entrance)−(the output at the sample exit), was measured. Under rich conditions, the test piece releases oxygen so that the output difference assumes a negative value. The oxygen release amount in each sample was obtained by summating the output differences under rich conditions in certain cycles.

Figure 8:
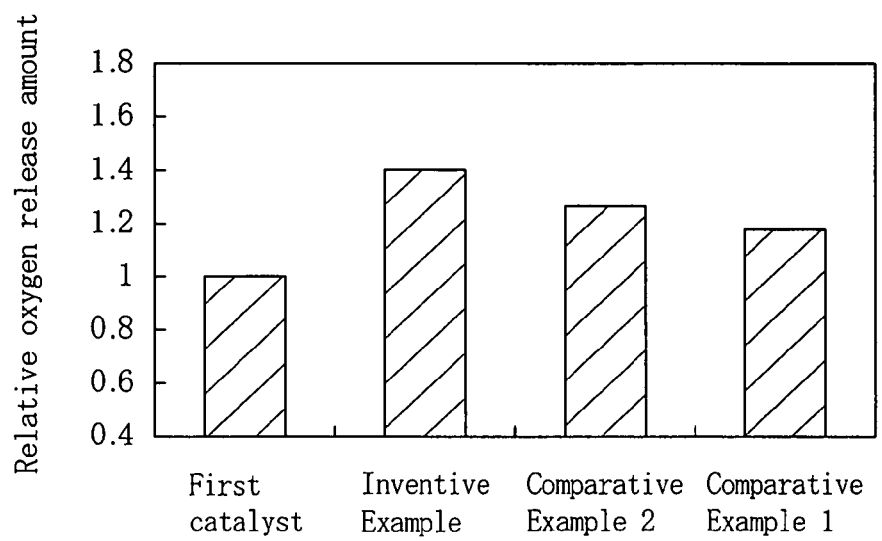
FIG. 8 is a graph showing the relative oxygen release amounts of the first catalyst of Inventive Example and the second catalysts of Inventive Example and Comparative Examples 1 and 2.

The oxygen release amount of the first catalyst was measured under a condition that the entrance gas temperature of the core sample 12 was set at 500° C., while the oxygen release amount of each of the second catalysts in Inventive Example and Comparative Examples 1 and 2 was measured under a condition that the entrance gas temperature of the core sample 12 was set at 400° C. The measurement results are shown in FIG. 8 by relative oxygen release amounts assuming that the oxygen release amount of the first catalyst is 1. The reason why the first and second catalysts had different entrance gas temperatures is that the first catalyst is closer to the engine than the second catalyst and is therefore exposed to high-temperature exhaust gas.

FIG. 8 shows that all of the second catalysts in Inventive Example and Comparative Examples 1 and 2, which use Rh-doped CeZrNdO as an oxygen storage component, exhibited larger oxygen release amounts than the first catalyst using CeZrNdO as an oxygen storage component. The same oxygen storage component generally releases a larger amount of oxygen at an entrance gas temperature of 500° C. than at an entrance gas temperature of 400° C. However, the second catalyst exhibited larger oxygen release amounts even at an entrance gas temperature of 400° C. than the first catalyst at an entrance gas temperature of 500° C. This is due to Rh doped in CeZrNdO.

A comparison among the second catalysts in Inventive Example and Comparative Examples 1 and 2 indicates that Inventive Example exhibited the largest oxygen release amount, Comparative Example 2 had the second largest oxygen release amount and Comparative Example 1 had the smallest oxygen release amount. This results fall in with the results of relative A/F window values (FIGS. 5 and 6). The reason why the second catalyst in Inventive Example exhibited a large oxygen release amount is believed to be that Pt-supported alumina mixed with Rh-supported and Rh-doped CeZrNdO consumed oxygen when oxidizing CO and, therefore, oxygen release from Rh-supported and Rh-doped CeZrNdO was promoted. The reason why the second catalyst in Comparative Example 1 exhibited a small oxygen release amount is believed to be that no Pt existed as a catalytic metal and, therefore, oxidation of CO due to Pt and its attendant oxygen release effect could not be provided.

Exhaust Gas Conversion Performance Due to Combination of First and Second Catalysts The catalytic conversion systems of Inventive Example and Comparative Examples 1 and 2 (in which the first and second catalysts are disposed in upstream and downstream sides, respectively, of exhaust gas flow) were measured in terms of conversion efficiencies C400 of HC, CO and NOx with a fixed-bed flow reactor. The first and second catalysts in Inventive Example and Comparative Examples 1 and 2 were previously aged by keeping them at 1000° C. in an air atmosphere for 24 hours. The conversion efficiency C400 is the catalytic conversion efficiency of each exhaust gas component when the simulated exhaust gas temperature at the catalyst entrance is 400° C. The simulated exhaust gas used had an A/F ratio of 14.7±0.9 shown in Table 2. The period of A/F fluctuation was set at 1.0 Hz and the space velocity SV was set at 60000/h. The measurement results are shown in Table 3.

TABLE 3

| | Conversion efficiency (%) due to combination of first and second catalysts | | |
|---|---|---|---|
| | HC | CO | NOx |
| Inventive example | 99.1 | 99.1 | 95.0 |
| Comparative Example 2 | 98.0 | 98.0 | 91.0 |
| Comparative Example 1 | 97.0 | 97.0 | 87.0 |

Inventive Example exhibited higher HC, CO and NOx conversion efficiencies than Comparative Examples 1 and 2. In particular, Inventive Example exhibited a significant difference in NOx conversion efficiency from the others. This proves that the configuration of the catalytic conversion system according to the present invention is effective in converting exhaust gas whose A/F ratio fluctuates.

What is claimed is:

1. An exhaust gas catalytic conversion system comprising:
   a first catalytic converter disposed in an upstream side of an exhaust passage of an engine in the direction of exhaust gas flow and including a first catalyst in which at least one catalyst layer for converting exhaust gas is formed on a honeycomb support; and
   a second catalytic converter disposed in the exhaust passage downstream of the first catalytic converter in the direction of exhaust gas flow and including a second catalyst in which at least one catalyst layer for converting exhaust gas is formed on a honeycomb support;
   the at least one catalyst layer of the first catalyst containing oxygen storage component particles, active alumina particles and a catalytic precious metal supported on at least either the oxygen storage component particles or the active alumina particles;
   the at least one catalyst layer of the second catalyst containing active alumina particles, mixed oxide particles containing Ce cations, cations of a rare earth element other than Ce, Zr cations and Rh cations and having an oxygen storage/release capacity, Rh supported as a catalytic precious metal on the surfaces of the mixed oxide particles, and Pt supported as a catalytic precious metal on the surfaces of the active alumina particles;
   the oxygen storage component particles in the first catalyst having a lower oxygen storage/release capacity than the mixed oxide particles in the second catalyst.

2. The exhaust gas catalytic conversion system of claim 1, wherein Rh on the surfaces of the mixed oxide particles in the second catalyst is supported on the mixed oxide particles by bringing a rhodium solution into contact with the mixed oxide particles and calcining the mixed oxide particles.

3. The exhaust gas catalytic conversion system of claim 1, wherein
   the first catalyst includes a plurality of catalyst layers laid on the honeycomb support, and
   Rh and Pd are placed as catalytic precious metals in different ones of the plurality of catalyst layers so that Pd is in a lower layer of the plurality of catalyst layers closer to cell walls of the honeycomb support and Rh is in an upper layer of the plurality of catalyst layers farther from the cell walls than the lower layer.

4. The exhaust gas catalytic conversion system of claim 3, wherein the upper layer of the first catalyst contains the active alumina particles, the surfaces of the active alumina particles are covered with particles containing Zr as a main component and Rh is supported on the active alumina particles coated with Zr.

5. The exhaust gas catalytic conversion system of claim 4, wherein the upper layer of the first catalyst contains oxygen storage component particles different from the oxide including Ce, Zr, Al and a rare earth metal other than Ce in the lower layer, and Rh is supported on the oxygen storage component particles in the upper layer.

6. The exhaust gas catalytic conversion system of claim 3, wherein the lower layer of the first catalyst contains as the oxygen storage component particles an oxide including Ce, Zr, Al and a rare earth metal other than Ce, and Pd is supported on the oxide.

7. The exhaust gas catalytic conversion system of claim 6, wherein the rare earth metal other than Ce comprises at least one of Y and La.

8. The exhaust gas catalytic conversion system of claim 6, wherein the oxide including Ce, Zr, Al and a rare earth metal other than Ce includes Al in a proportion of 90 mol % or more of the total metal components.

9. The exhaust gas catalytic conversion system of claim 6, wherein the first catalyst contains oxygen storage component particles different from the oxide including Ce, Zr, Al and a rare earth metal other than Ce, the oxygen storage component particles having no catalytic precious metal supported thereon.

10. The exhaust gas catalytic conversion system of claim 6, wherein the lower layer of the first catalyst contains the active alumina particles and Pd is supported on the active alumina particles.

* * * * *